US008837113B2

(12) United States Patent
Abe et al.

(10) Patent No.: US 8,837,113 B2
(45) Date of Patent: Sep. 16, 2014

(54) CAPACITOR MODULE WITH SIMPLIFIED WIRING ARRANGEMENT AND STRUCTURE

(75) Inventors: Seiichiro Abe, Tochigi (JP); Kenichi Takebayashi, Tochigi (JP)

(73) Assignee: Keihin Corporation, Tokyo (JP)

( * ) Notice: Subject to any disclaimer, the term of this patent is extended or adjusted under 35 U.S.C. 154(b) by 199 days.

(21) Appl. No.: 13/048,238

(22) Filed: Mar. 15, 2011

(65) Prior Publication Data

US 2011/0228445 A1  Sep. 22, 2011

(30) Foreign Application Priority Data

Mar. 17, 2010  (JP) .................................. 2010-061041

(51) Int. Cl.
    *H01G 4/38*  (2006.01)
(52) U.S. Cl.
    CPC ..................................... *H01G 4/38* (2013.01)
    USPC ........................................................ 361/329
(58) Field of Classification Search
    CPC ................................. H01G 4/38; H01G 2/02
    USPC ............................................... 361/328, 329
    See application file for complete search history.

(56) References Cited

U.S. PATENT DOCUMENTS

| 4,677,523 | A | * | 6/1987 | Kauppi ......................... 361/329 |
| 5,075,815 | A | * | 12/1991 | Price .......................... 361/274.1 |
| 5,132,896 | A | * | 7/1992 | Nishizawa et al. ........... 363/144 |
| 5,493,471 | A | * | 2/1996 | Walther et al. ............... 361/328 |
| 6,212,058 | B1 | * | 4/2001 | Huber ......................... 361/301.5 |
| 6,563,691 | B2 | * | 5/2003 | Kijima et al. ................. 361/328 |
| 6,631,071 | B2 | * | 10/2003 | Kitagawa et al. ............. 361/328 |
| 7,092,238 | B2 | * | 8/2006 | Saito et al. ..................... 361/329 |
| 8,112,853 | B2 | * | 2/2012 | Yoshinaga et al. ........... 29/25.42 |
| 2010/0053927 | A1 | * | 3/2010 | Inoue et al. .................... 361/830 |

FOREIGN PATENT DOCUMENTS

| JP | 01057706 | A | * | 3/1989 |
| JP | 5-48327 | U | | 6/1993 |
| JP | 05-207746 | A | | 8/1993 |
| JP | 10094256 | A | * | 4/1998 |
| JP | 11-55938 | A | | 2/1999 |
| JP | 11-288855 | A | | 10/1999 |
| JP | 2001-245480 | A | | 9/2001 |
| JP | 2006310490 | A | * | 11/2006 |
| JP | 2010-199463 | A | | 9/2010 |

OTHER PUBLICATIONS

Japanese Office Action dated Sep. 25, 2013, issued in corresponding Japanese Patent Application No. 2010-061041 with English translation (4 pages).

* cited by examiner

*Primary Examiner* — David M Sinclair

(74) *Attorney, Agent, or Firm* — Westerman, Hattori, Daniels & Adrian, LLP

(57) ABSTRACT

A capacitor module is provided with a plurality of capacitors juxtaposedly disposed to have electrode terminals that are composed of positive electrode terminals and negative electrode terminals, respectively. Neighboring capacitors, among the plurality of capacitors, are disposed adjacent to each other to define neighboring electrode terminals, among the electrode terminals thereof, with the same polarity.

4 Claims, 5 Drawing Sheets

CAPACITOR MODULE WITH SIMPLIFIED WIRING ARRANGEMENT AND STRUCTURE

BACKGROUND OF THE INVENTION

The present invention relates to a capacitor module and, more particularly, to a capacitor module in which a plurality of capacitors, forming a capacitor module, are disposed in proximity to each other.

In recent years, a hybrid vehicle provided with a drive-force source composed of an engine, such as an internal combustion engine, and a motor such as an electric motor, have been widely spread in use. Such a hybrid vehicle has a power drive unit through which a direct current, supplied from a battery, is converted to an alternate current for supply to the motor whereas an alternate current, resulting from regenerative operation of the motor, is converted to a direct current for storage in the battery.

The power drive unit typically includes a capacitor module for smoothing the direct current delivered from the battery, and a power module for converting the direct current, smoothed by the capacitor module, into the alternate current. With such a power drive unit, since a need has been arisen to have a capacitor module with further increased capacity, it has been proposed to form a capacitor module with a plurality of capacitors for thereby increasing a capacity of the capacitor module.

Japanese Patent Application Laid-Open Publication No. H5-207746 discloses a structure, related to an inverter, in which capacitor units, composed of a group of smoothing capacitors, which are accommodated one above the other in a case in multiple stages. Two positive electrode bus bars and one negative electrode bus bar are arranged to stand upright at backsides of the capacitor units such that the positive electrode terminals of the capacitor units are directly connected to one of the two positive electrode bus bars and the negative electrode terminals of the capacitor units are directly connected to the negative electrode bus bar.

Japanese Patent Application Laid-Open Publication No. 2001-245480 relates to a semiconductor power conversion device including eight pieces of capacitors, disposed in two rows, having terminals which are placed in two rows on the same plane, respectively. In particular, one pieces of the terminals of the capacitors are connected to an intermediate conductor, with the other pieces of the terminals of the capacitors are correspondingly connected to a positive electrode conductor and a negative electrode conductor. Such three conductors are stacked in electrically insulated condition from each other.

SUMMARY OF THE INVENTION

Upon studies conducted by the present inventor, however, in Japanese Patent Application Laid-Open Publications No. H5-207746 and No. 2001-245480, the plurality of capacitors are disposed such that a set of adjacent terminals results in the formation of a set of terminals with different polarities of a positive electrode terminal and a negative electrode terminal.

With the structure disclosed in Japanese Patent Application Laid-Open Publication No. H5-207746, more particularly, the positive electrode terminals and the negative electrode terminals of the plurality of capacitors are lined up in orientation, and the positive electrode terminals and the negative electrode terminals of the neighboring capacitors are connected via strip-like bus bars, respectively. With the structure disclosed in Japanese Patent Application Laid-Open Publication No. 2001-245480, the plurality of capacitors are disposed with the positive electrode terminals and the negative electrode terminals being lined up in orientation. In addition, the three conductors, to which the respective associated terminals are connected, have a need to be stacked in state with the respective conductors being electrically insulated.

Therefore, such a structure has a tendency in which the plurality of capacitors need to be disposed upon taking account of clearances between the capacitors and, hence, it becomes difficult to miniaturize the structure with increasing package density of the plurality of capacitors. Further, a need arises to place the electrical insulation member between connecting portions to which the respective associated terminals are connected with a resultant tendency to be complicated in structure.

The present invention has been completed with the above view in mind and has an object to provide a capacitor module that is capable of excluding the use of an electrical insulation member between wirings with resultantly increased freedom of wiring arrangement, while reducing a size of the capacitor module with a simplified structure thereof.

To achieve the above object, according to a first aspect of the present invention, a capacitor module is provided with a plurality of capacitors juxtaposedly disposed to have electrode terminals that are composed of positive electrode terminals and negative electrode terminals, respectively, wherein neighboring capacitors, among the plurality of capacitors, are disposed adjacent to each other to define neighboring electrode terminals, among the electrode terminals thereof, with the same polarity.

In addition to the first aspect, further, the present invention has a second aspect in which the electrode terminals are arranged to stand upright from first surfaces of the plurality of capacitors, respectively, such that the positive electrode terminals are disposed in the first surfaces at first circumferential portions thereof and the negative electrode terminals are disposed in the first surfaces at second circumferential portions oppositely distant from the first circumferential portions, and the neighboring capacitors, among the plurality of capacitors, are juxtaposed with surfaces, orthogonal to the first surface thereof, being in close proximity to each other.

In addition to the first or second aspect, furthermore, the present invention has a third aspect in which the neighboring capacitors, among the plurality of capacitors, have the neighboring electrode terminals with the same polarity connected to a common wiring portion.

In addition to either one of the first to third aspects, moreover, the present invention has a fourth aspect in which the plurality of capacitors are polar capacitors, formed in cuboid-like shapes, with being electrically connected in parallel to each other.

In addition to either one of the first to fourth aspects, besides, the present invention has a fifth aspect in which the plurality of capacitors function as smoothing capacitors for smoothing a direct current.

With the capacitor module of the first aspect of the present invention, the neighboring capacitors, among the plurality of capacitors, are disposed adjacent to each other to define the neighboring electrode terminals, among the electrode terminals thereof, with the same polarity. This excludes the use of the electrical insulation member between wirings and ensures an increase in freedom of wiring arrangement. This results in reduction of the clearance between the capacitors with a resultant increase in package density of the plurality of capacitors, thereby enabling the capacitor module to be reduced in size with a simplified structure.

With the capacitor module of the second aspect of the present invention, the electrode terminals are arranged to stand upright from first surfaces of the plurality of capacitors, respectively, such that the positive electrode terminals are disposed in the first surfaces at first circumferential portions thereof and the negative electrode terminals are disposed in the first surfaces at second circumferential portions opposedly distant from the first circumferential portions, and wherein the neighboring capacitors, among the plurality of capacitors, are juxtaposed with planes, orthogonal to the first surface thereof, being in close proximity to each other. This further reliably excludes the use of the electrical insulation member between wirings and ensures an increased freedom of wiring arrangement, thereby further reliably enabling the capacitor module to be reduced in size with a simplified structure.

With the capacitor module of the third aspect of the present invention, the neighboring capacitors, among the plurality of capacitors, have the neighboring electrode terminals with the same polarity connected to the common wiring portion. This further reliably enables the capacitor module to be reduced in size with a simplified structure.

With the capacitor module of the fourth aspect of the present invention, the plurality of capacitors are polar capacitors, formed in cuboid-like shapes, with being electrically connected in parallel to each other. This enables the capacitor module to be reduced in size while allowing the capacitor module to have a large capacity.

With the capacitor module of the fifth aspect of the present invention, the plurality of capacitors function as smoothing capacitors for smoothing the direct current. This results in formation of the power drive unit by combining the capacitor module, including such the plurality of capacitors, with the power module available to perform conversion between the direct current and the alternate current.

BRIEF DESCRIPTION OF THE DRAWINGS

FIG. 3 is viewed in a positive direction of a y-axis thereof.

FIG. 3 is viewed in a positive direction of a z-axis thereof.

DETAILED DESCRIPTION OF THE PREFERRED EMBODIMENT

Now, a capacitor module of an embodiment according to the present invention will be described below in detail with reference to the accompanying drawings. Throughout the drawings, an x-axis, a y-axis and a z-axis form a three-axis orthogonal coordinate system with a direction along the x-axis representing a longitudinal direction, a direction along the y-axis representing a lateral direction and a direction along the z-axis representing a vertical direction.

First, a structure of a control apparatus for a vehicle, to which the capacitor module of the present embodiment is applied, will be described below in detail with reference to FIG. 1. In addition, the capacitor module of the present embodiment will be described below with reference to an exemplary structure applied to a power drive unit.

Figure 1:
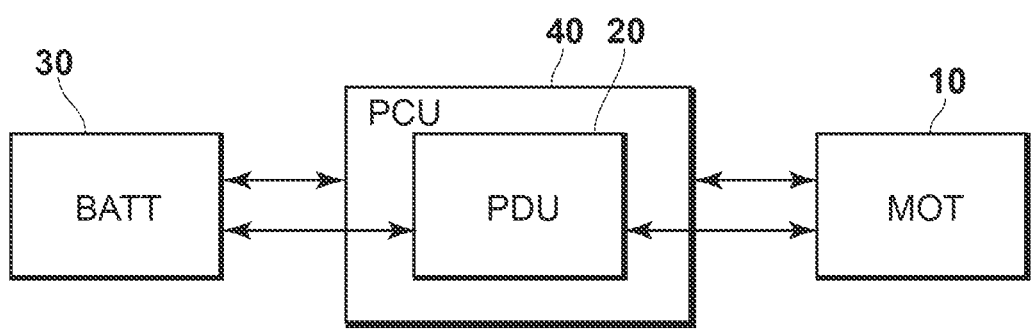
FIG. 1 is a block diagram showing a structure of a control apparatus, with its related devices, for a vehicle to which a capacitor module of an embodiment according to the present invention is applied.

FIG. 1 is a block diagram showing a structure of a control apparatus, with its related devices, for the vehicle to which the capacitor module of the present embodiment is applied.

In the illustrated embodiment, as shown in FIG. 1, a motor 10 is mounted on the vehicle such as a motor vehicle, which is not shown in the drawings, and connected to a battery 30 via a PDU (Power Drive Unit) 20.

The motor 10 typically is an alternate current synchronous motor such as a DC brushless motor to which electric power is supplied in a three-phase alternate current for operation. In the vehicle driven with a drive-force source composed of only the motor 10, the motor 10 serves to supply a drive force for driving the vehicle. On the contrary, in the vehicle driven with a main drive-force source composed of an engine such as an internal combustion engine that is not shown in the drawings, the motor 10 is used in combination with a drive force of the engine in a supplementary and complementary fashion. In this case, the motor 10 can also have a function to suitably and selectively operate as not only a starter motor when starting up the engine but also an electric power generator with the engine remaining under operation. In any case, moreover, the motor 10 can suitably and selectively function as an energy regenerating mechanism upon utilizing inertial energy during deceleration of the vehicle.

The battery 30 typically is a secondary battery such as a nickel metal-hydride battery and a lithium-ion battery, and supplies the motor 10 and other auxiliary equipment with electric power at required rates. In addition, the battery 30 is able to store regenerative electric power collected through the motor 10 or the like and electric power generated by the motor 10, an electric power generator that is separately provided but not shown in the drawings, or the like.

The PDU 20 is a low-level controller of a PCU (Power Control Unit) 40 that totally controls the motor 10 and the battery 30. The PDU 20 performs in combination both a DC/AC converter function, in which when a three-phase alternate current is employed, a direct current delivered from the battery 30 is stably converted into a three-phase alternate current for supply to the motor 10, and an AC/DC converter, in which an alternate current such as a regenerative alternate current delivered from the motor 10 is stably converted to a direct current for supply to the battery 30. Besides, the PDU 20 may suffice to have only the function of the DC/AC converter arranged to stably convert a direct current, delivered from the battery 30, into a three-phase alternate current for supply to the motor 10 depending on needs.

Under a circumstance where a main drive-force source of the vehicle is comprised of a fuel cell that is not shown in the drawings, the battery 30 is able to supply auxiliary equipment with electric power at required rates while making it possible to store excessive electric power from the fuel cell, regenerative electric power, or the like. Under such a circumstance, further, the PDU 20 acts as the low-level controller of the PCU 40, which totally controls the battery 30 and the fuel cell, to have combined functions of both the DC/AC converter, in which a direct current mainly delivered from the fuel cell is stably converted into a three-phase alternate current for supply to the motor 10, and the AC/DC converter, in which an alternate current such as a regenerative alternate current delivered from the motor 10 is stably converted to a direct current for supply to the battery 30.

Next, a concrete structure of the capacitor module will be described below in detail with reference to FIGS. 2 to 5.

Figure 2:
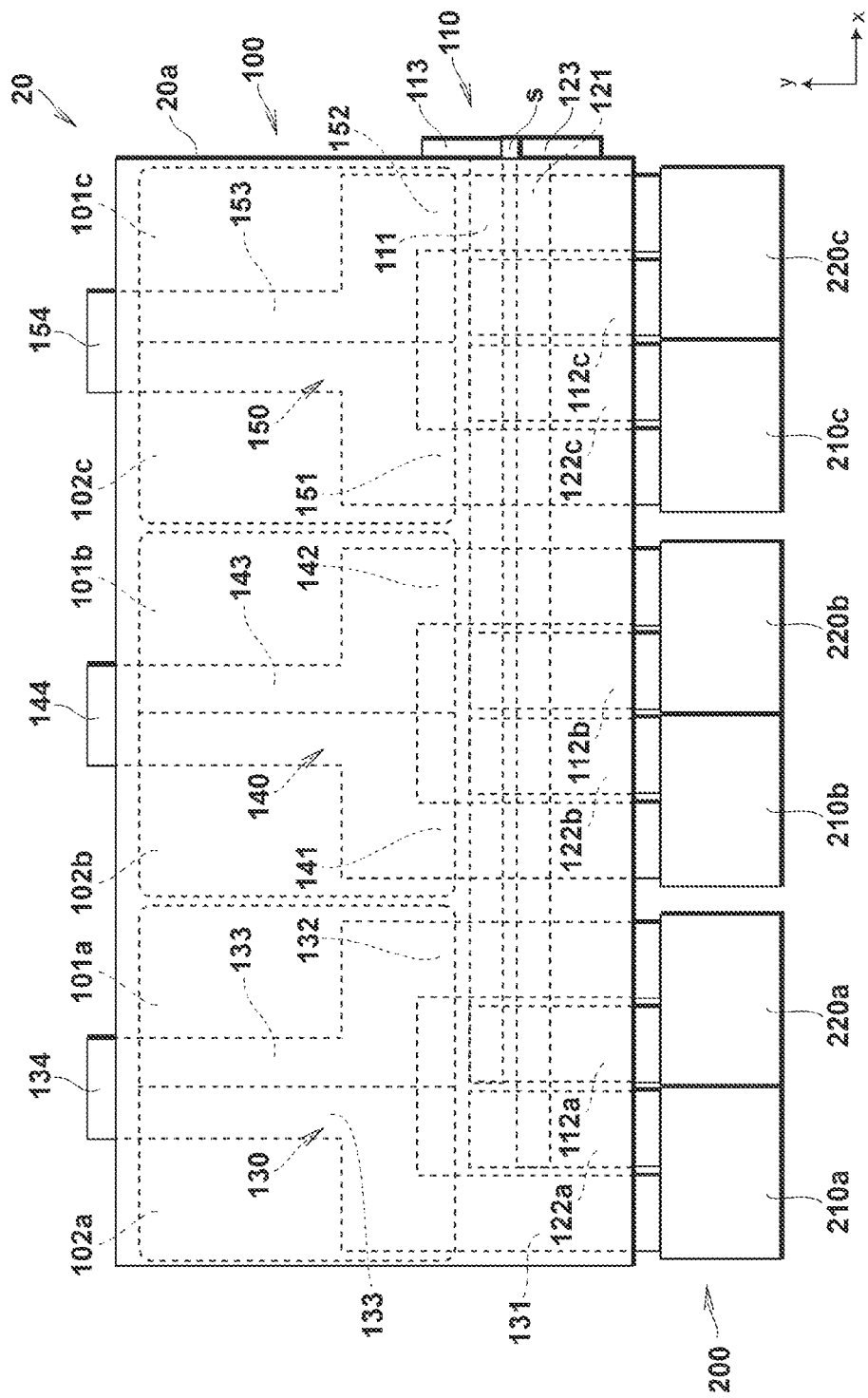
FIG. 2 is a plan view of a power drive unit to which the capacitor module of the present embodiment is applied.
Figure 3:
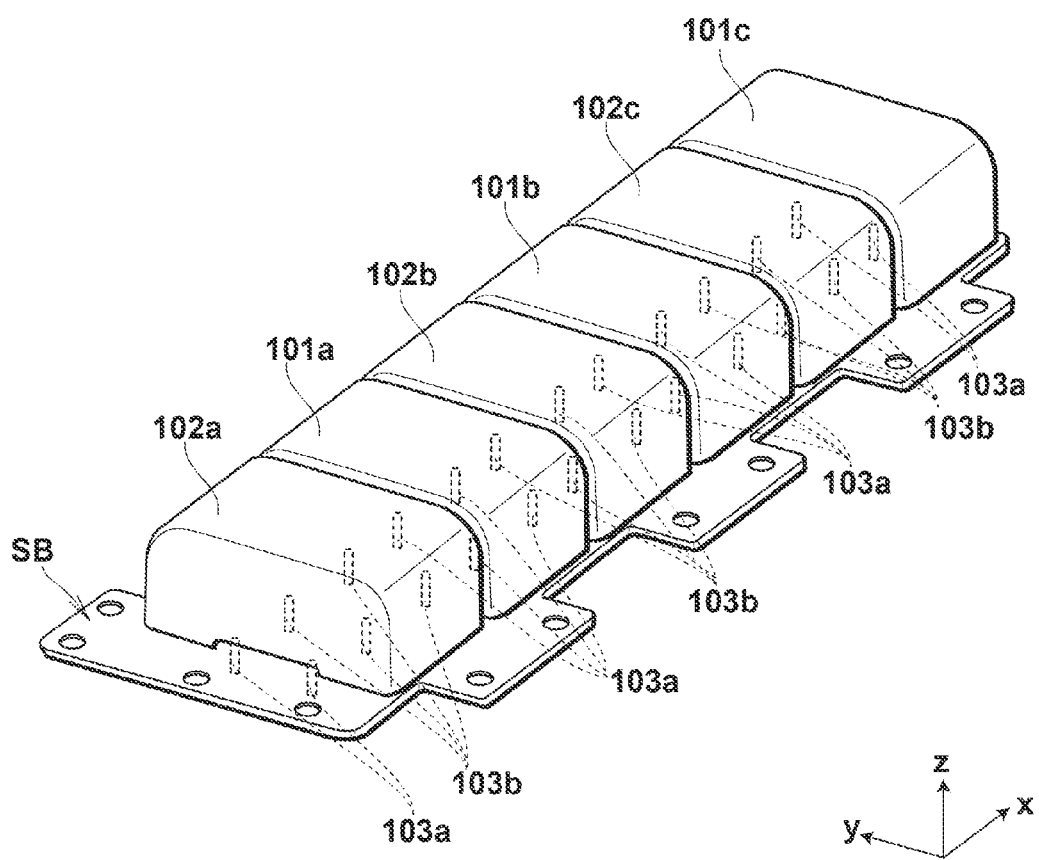
FIG. 3 is a perspective view showing a plurality of capacitors incorporated in the capacitor module of the present embodiment.
Figure 4:
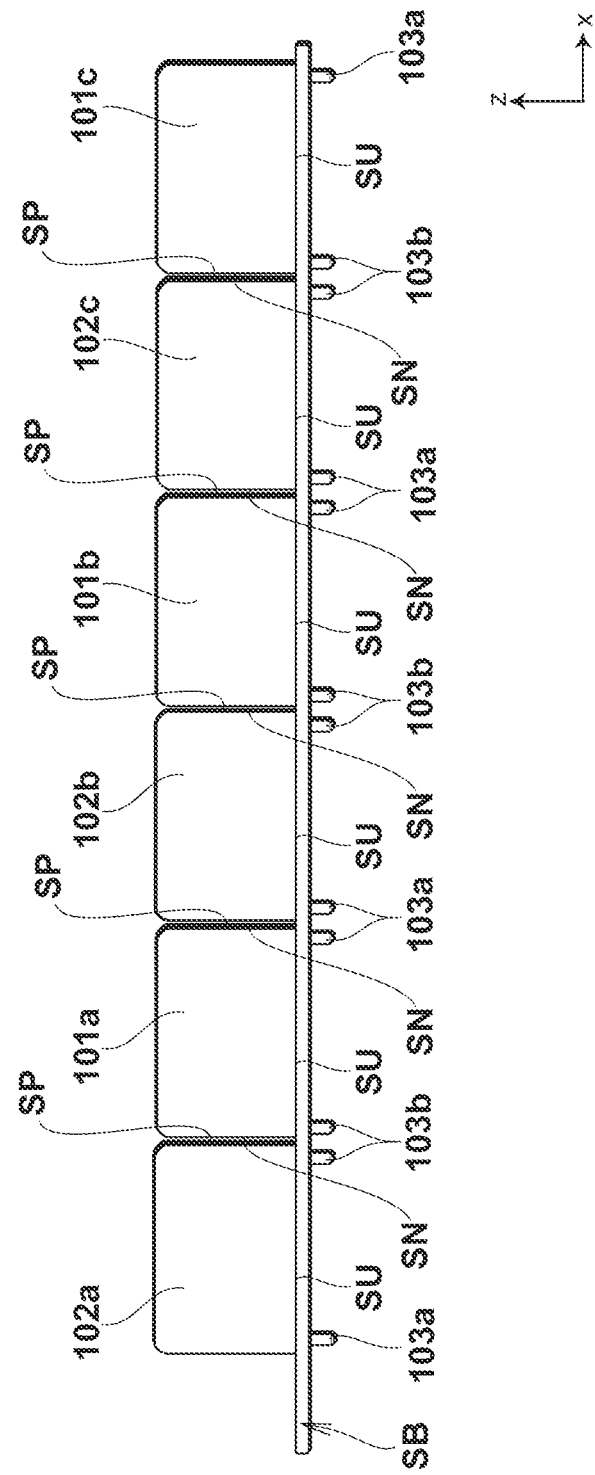
FIG. 4 is a side view showing the plurality of capacitors incorporated in the capacitor module of the present embodiment and corresponds to a view when
Figure 5:
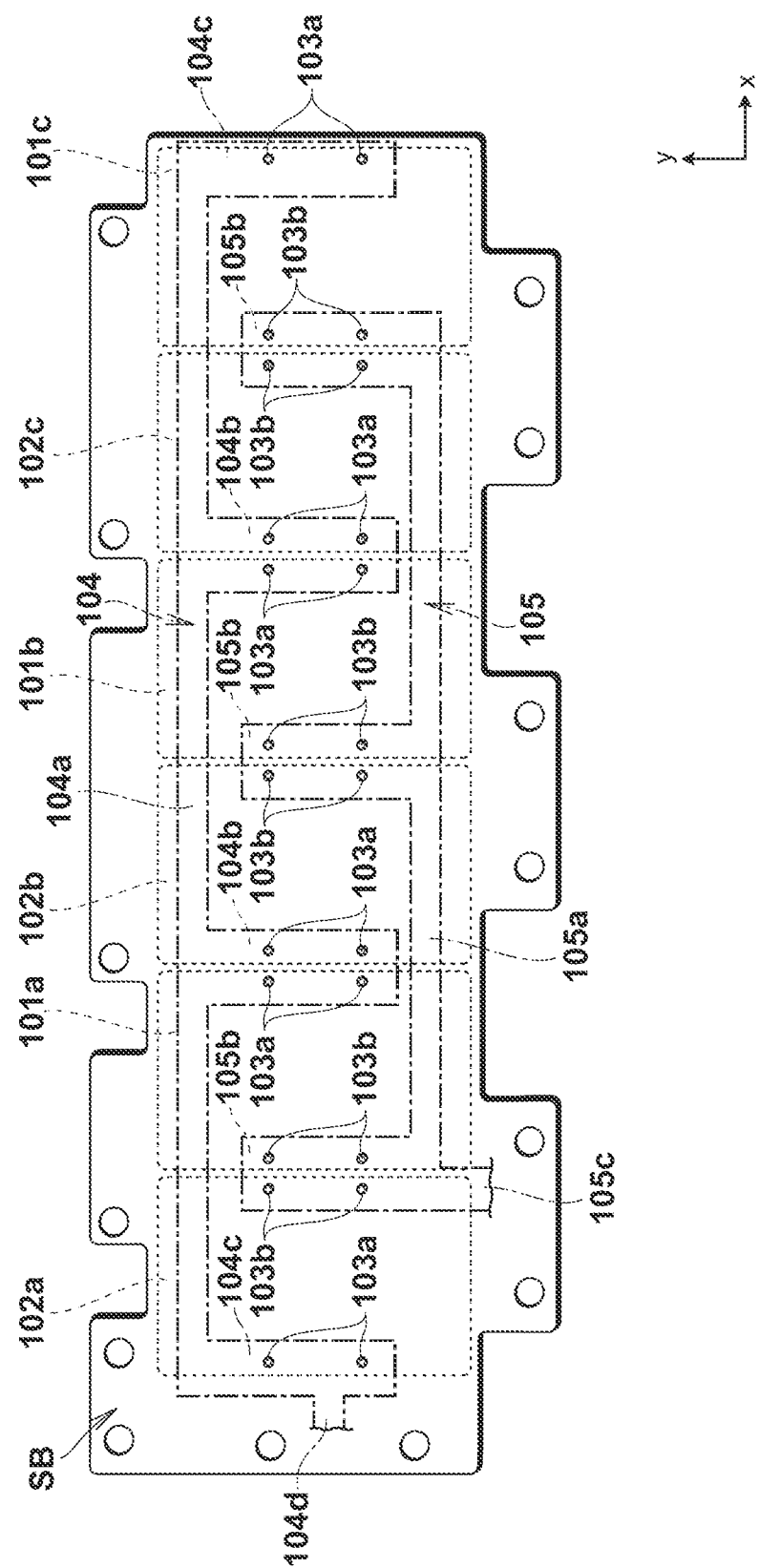
FIG. 5 is a bottom view showing the plurality of capacitors incorporated in the capacitor module of the present embodiment and corresponds to a view when

FIG. 2 is a plan view of the power drive unit, to which the capacitor module of the present embodiment is applied. FIG. 3 is a perspective view showing a plurality of capacitors incorporated in the capacitor module of the present embodiment. FIG. 4 is a side view showing the plurality of capacitors incorporated in the capacitor module of the present embodiment and corresponds to a view when FIG. 3 is viewed in the positive direction of the y-axis thereof. Further, FIG. 5 is a bottom view showing the plurality of capacitors incorporated in the capacitor module of the present embodiment and corresponds to a view when FIG. 3 is viewed in the positive direction of the z-axis thereof.

As shown in FIG. 2, a capacitor module 100 of the present embodiment forms a component part of the PDU 20. The PDU 20, having a case 20a formed in cuboid-like outer shape and made of resin or the like, is provided with the capacitor module 100 for smoothing the direct current supplied from the battery 30 shown in FIG. 1, and a power module 200 juxtaposed to face a front surface, extending along a longitudinal direction of the capacitor module 100, of the case 20a for converting the direct current, smoothed by the capacitor module 100, into, for instance, the three-phase alternate current and subsequently supplying such a three-phase alternate current to the motor 10. In addition, the PDU 20 may cause the power module 200 to convert the alternative current, supplied to the power module 200, into the direct current and further causing the capacitor module 100 to smooth the supplied direct current and subsequently storage the smoothed direct current in the battery 30. In the following description, however, for the sake of convenience in description, a reference will be made typically to a case wherein the direct current, supplied to the capacitor module 100, is smoothed by the capacitor module 100 and subsequently converted by the power module 200 into the three-phase alternate current for supplying such a three-phase alternate current to the motor 10.

The capacitor module 100, having its longitudinal direction along the direction of the x-axis, is provided with capacitors 101a, 101b, 101c, 102a, 102b and 102c. The capacitors 101a, 101b, 101c, 102a, 102b and 102c smooth the direct current, supplied from the battery 30, to be output to the power module 200, respectively.

Here, the capacitor module 100 is further provided with a positive electrode bus bar 110 and a negative electrode bus bar 120. That is, the positive electrode bus bar 110 and the negative electrode bus bar 120 are connected to the capacitors 101a, 101b, 101c, 102a, 102b and 102c in association with respective positive electrode terminals 103b and respective negative electrode terminals 103a such that the direct current, smoothed by the capacitors 101a, 101b, 101c, 102a, 102b and 102c, is input to the power module 200.

The positive electrode bus bar 110 integrally includes a tabular longitudinal member 111 extending along the longitudinal direction of the capacitor module 100, and tabular lateral members 112a, 112b and 112c extending along a lateral direction, in parallel to the direction of the y-axis, of the capacitor module 100 in connection to a top portion of a side surface of the longitudinal member 111 extending along the longitudinal direction. One end of the longitudinal member 111 extending along the longitudinal direction is exposed at a side surface, extending along the lateral direction of the capacitor module 100, of the case 20a to form a positive electrode terminal 113 for connection to a positive electrode, not shown in the drawings, of the battery 30. The lateral members 112a, 112b and 112c are connected to input connecting portions, described below in detail, of the power module 200 at a high level.

Meanwhile, the negative electrode bus bar 120 integrally includes a tabular longitudinal member 121 extending along the longitudinal direction of the capacitor module 100, and tabular lateral members 122a, 122b and 122c extending along the lateral direction of the capacitor module 100 in connection to a top portion of a side surface of the longitudinal member 121 extending along the longitudinal direction. One end of the longitudinal member 121 extending along the longitudinal direction is exposed at the side surface, extending along the lateral direction of the capacitor module 100, of the case 20a to form a negative electrode terminal 123 for connection to a negative electrode, not shown in the drawings, of the battery 30. The lateral members 122a, 122b and 122c are connected to input connecting portions, described below in detail, of the power module 200 at a low level.

Here, the tabular longitudinal member 111 of the positive electrode bus bar 110, which extends in the longitudinal direction of the capacitor module 100, and the longitudinal member 121 of the negative electrode bus bar 120, which extends in the longitudinal direction of the capacitor module 100, are placed in close proximity to each other with intervention of a tabular electrical insulation member "s" in tight contact.

Further, the capacitor module 100 is provided with output bus bars 130, 140 and 150 through which the alternate current, output from the power module 200, is supplied to the motor 10. The output bus bars 130, 140 and 150 is made of tabular members formed in bifurcated shapes, as shown in the plan view of FIG. 2, and arranged in the case 20a with different vertical height positions to be higher than vertical height positions of the positive electrode bus bar 110 and the negative electrode bus bar 120, respectively.

Specifically, the output bus bars 130, 140 and 150 integrally include low level connecting members 131, 141 and 151, high level connecting members 132, 142 and 152, and output members 133, 143 and 153, respectively. The low level connecting members 131, 141 and 151 and the high level connecting members 132, 142 and 152 are connected to output connecting portions of a low level of the power module 200 and output connecting portions of a high level of the power module 200, respectively, as described below in detail.

The output members 133, 143 and 153 have end portions exposed at a rear surface, extending along the longitudinal direction of the capacitor module 100, of the case 20a to form output terminals 134, 144 and 154 for connection to the motor 10, respectively.

Here, with the positive electrode bus bar 110, the negative electrode bus bar 120 and the output bus bars 130, 140 and 150, the low level connecting member 131, the lateral member 122a, the lateral member 112a, the high level connecting member 132, the low level connecting member 141, the lateral member 122b, the lateral member 112b, the high level connecting member 142, the low level connecting member 151, the lateral member 122c, the lateral member 112c and the high level connecting member 152 are disposed in close proximity to each other in this order along the longitudinal direction of the capacitor module 100.

Supposing that the power module 200 is applied with the three-phase alternate current, the power module 200 is provided with a U-phase low level switching power module 210a, a U-phase high level switching power module 220a, a V-phase low level switching power module 210b, a V-phase high level switching power module 220b, a W-phase low level switching power module 210c and a W-phase high level switching power module 220c. Incidentally, with each of the power modules, specifications of the bus bars in arrangement may be altered to form combined unitary structures as low level and high level switching power modules for a U-phase, a V-phase and a W-phase, respectively.

The low level switching power modules 210a, 210b and 210c are connected to the lateral members 122a, 122b and 122c of the capacitor module 100 and also connected to the low level connecting members 131, 141 and 151 of the capacitor module 100, respectively. With the low level switching power modules 210a, 210b and 210c, portions, which are connected to the lateral members 122a, 122b and 122c, serve as input connecting portions at low levels, respectively, and portions, which are connected to the low level connecting members 131, 141 and 151, serve as output connecting portions at low levels, respectively. Such low level switching power modules 210a, 210b and 210c convert respective direct currents, supplied through the lateral members 122a, 122b and 122c, into respective alternate currents at a voltage of a low level to allow such alternate currents to be output to the low level connecting members 131, 141 and 151, correspondingly.

Meanwhile, the high level switching power modules 220a, 220b and 220c are connected to the lateral members 112a, 112b and 112c of the capacitor module 100 and also connected to the high level connecting members 132, 142 and 152 of the capacitor module 100, respectively. With the high level switching power modules 220a, 220b and 220c, portions, which are connected to the lateral members 112a, 112b and 112c, serve as input connecting members at high levels, respectively, and portions, which are connected to the high level connecting members 132, 142 and 152, serve as output connecting portions at high levels, respectively. Such high level switching power modules 220a, 220b and 220c convert respective direct currents, supplied through the lateral members 112a, 112b and 112c, into respective alternate current at the voltage of the high level to allow such alternate currents to be output to the high level connecting members 132, 142 and 152, correspondingly.

Besides, as shown in FIGS. 3 to 5 in more detail, the capacitors 101a, 101b, 101c, 102a, 102b and 102c of the capacitor module 100 are capacitor elements having polarities such as film-type capacitors and electrolytic-type capacitors, respectively. These capacitors 101a, 101b, 101c, 102a, 102b and 102c are mounted on a surface, in parallel to the x-y plane, of a supporting substrate SB fixed to the case 20a of the PDU 20, in which the capacitor module 100 is incorporated, to be disposed in close proximity to each other along the direction of the x-axis such that the capacitors 102a, 101a, 102b, 101b, 102c and 101c are mounted in this order along the longitudinal direction of the capacitor module 100. Incidentally, the number of pieces of such capacitors is not limited to six pieces and may suffice to include plural pieces. In addition, the supporting substrate SB will be described below as of the type composed of a printed circuit board such as a glass epoxy-type substrate but may be a supporting body made of resin to which bus bars or the like are suitably connected.

Printed wirings 104 and 105, shown by double dot lines in FIG. 5, are respectively formed on the surface, in parallel to the x-y plane, of the supporting substrate SB. The printed wiring 104 includes an intermediate portion 104a, two wider connecting portions 104b, two narrower connecting portions 104c and a connecting terminal portion 104d. Specifically, the wider connecting portions 104b and the narrower connecting portions 104c are connected to each other via the intermediate portion 104a, and the printed wiring 104 is connected to the negative electrode bus bar 120 of the capacitor module 100 via the connecting terminal portion 104d that is connected to the intermediate portion 104a via the narrower connecting portion 104c disposed at the negative direction side of the x-axis among the two narrower connecting portions 104c. Further, the printed wiring 105 includes an intermediate portion 105a, four connecting portions 105b and a connecting terminal portion 105c. Specifically, the connecting portions 105b are connected to each other via the intermediate portion 105a, and the printed wiring 105 is connected to the positive electrode bus bar 110 of the capacitor module 100 via the connecting terminal portion 105c that is connected to the intermediate portion 105a. Incidentally, the printed wirings 104 and 105b are not limited in such specifications of wiring arrangement and may suffice to take a structure enabling the connecting portions 104b, 104c and 105b to be connected in association with the positive bus bar 110 and the negative bus bar 120 of the capacitor module 100.

The capacitors 101a, 101b and 101c are formed in respective cuboid-like outer shapes to have structures in each of which a pair of positive electrode terminals 103b stand upright from a bottom surface SU, which is in parallel to the plane x-y, toward a negative direction of the z-axis, at one circumferential edge portion that is positioned at the negative direction side of the x-axis on the bottom surface SU and a pair of negative electrode terminals 103a stand upright from the bottom surface SU toward the negative direction of the z-axis at the other circumferential edge portion that is positioned at the positive direction side of the x-axis to be opposedly distant from the one circumferential edge portion, at which the pair of positive electrode terminals 103b stand upright, on the bottom surface SU. Although the negative electrode terminals 103a and the positive electrode terminals 103b form electrode terminals of the capacitors 101a, 101b and 101c, these electrode terminals are not limited to such a structure in pair and only one piece or three or more pieces may be provided, as the case may be.

With the capacitors 101a, 101b and 101c, the negative electrode terminals 103a are connected to the connecting portions 104b and 104c of the printed circuit board 104, respectively, and the positive electrode terminals 103b are connected to the connecting portions 105b of the printed circuit board 105, respectively.

Meanwhile, the capacitors 102a, 102b and 102c are formed in cuboid-like outer shapes to have structures in each of which a pair of negative electrode terminals 103a stand upright from a bottom surface SU, which is in parallel to the plane x-y, toward the negative direction of the z-axis at one circumferential edge portion that is positioned at the negative direction side of the x-axis on the bottom surface SU and a pair of positive electrode terminals 103b stand upright from the bottom surface SU toward the negative direction of the z-axis at the other circumferential edge portion that is positioned at the positive direction side of the x-axis to be opposedly distant from the one circumferential edge portion at which the pair of negative electrode terminals 103a stand upright, on the bottom surface SU. Although the negative electrode terminals 103a and the positive electrode terminals 103b form electrode terminals of the capacitors 102a, 102b and 102c, these electrode terminals are not limited to such a structure in pair and only one piece or three or more pieces may be provided, as the case may be.

With the capacitors 102a, 102b and 102c, the negative electrode terminals 103a are connected to the connecting portions 104b and 104c of the printed circuit board 104, respectively, and the positive electrode terminals 103b are connected to the connecting portions 105b of the printed circuit board 105, respectively.

That is, with such a connecting structure, the capacitors 101a, 101b, 101c, 102a, 102b and 102c are electrically connected in parallel to each other and, also, electrically connected in parallel between the battery 30 and the power module 200.

Here, the capacitors 101a, 101b and 101c have structures in each of which the pair of positive electrode terminals 103b stand upright from the bottom surface SU at the circumferential edge portion positioned at the negative direction side of the x-axis and the pair of negative electrode terminals 103a stand upright from the bottom surface SU at the circumferential edge portion positioned at the positive direction side of the x-axis. In addition, the capacitors 102a, 102b and 102c have structures in each of which the pair of negative electrode terminals 103a stand upright from the bottom surface SU at the circumferential edge portion positioned at the negative direction side of the x-axis and the pair of positive electrode terminals 103b stand upright from the bottom surface SU at the circumferential edge portion positioned at the positive direction side of the x-axis. With such a structure, suppose that the capacitors 102a, 101a, 102b, 101b, 102c and 101c are mounted on the surface of the supporting substrate SB in such an order along the longitudinal direction of the capacitor module 100, that is, along the direction of the x-axis, except for the electrode terminals disposed at both ends in the direction of the x-axis, the neighboring negative electrode terminals 103a and the neighboring positive electrode terminals 103b, that is, specifically, the positive electrode terminals 103b of the capacitors 102a and 101a, the negative electrode terminals 103a of the capacitors 101a and 102b, the positive electrode terminals 103b of the capacitors 102b and 101b, the negative electrode terminals 103a of the capacitors 101b and 102c, and the positive electrode terminals 103b of the capacitors 102c and 101c are disposed correspondingly in close proximity to each other.

With such a capacitor module 100, further, the neighboring negative electrode terminals 103a and the neighboring positive electrode terminals 103b are disposed correspondingly in close proximity to each other in such a way. This allows the supporting substrate SB to have the connecting portions 104b of the printed circuit board 104 and the connecting portions 105b of the printed circuit board 105 that are disposed in positions distant from each other with no occurrence of interference therebetween and no need of providing an electrical insulation member therebetween, and also, such connecting portions 104b and 105b are able to be commonly used for the neighboring negative electrode terminals 103a and the neighboring positive electrode terminals 103b, correspondingly. Incidentally, in a case where the neighboring negative electrode terminals 103a and the neighboring positive electrode terminals 103b are formed in pairs, respectively, the connecting portions 104b and the connecting portions 105b may not be commonly used for all of the electrode terminals formed in pairs. For explaining such relations, typically with reference to the capacitors 102a and 101a, a part of the connecting portion 105b for one positive electrode terminal 103b and the other positive electrode terminal 103b, disposed adjacent to each other in the direction of the y-axis, of the capacitor 102a and a part of the connecting portion 105b for one positive electrode terminal 103b and the other positive electrode terminal 103b, disposed adjacent to each other in the direction of the y-axis, of the capacitor 101a may be formed in two pieces to be arranged in separate directions.

With the negative electrode terminals 103a, the positive electrode terminals 103b, the connecting portions 104b and the connecting portions 105b being formed in the capacitor module 100 in such a way, the capacitors 102a, 101a, 102b, 101b, 102c and 101c are juxtaposed in such an order in close proximity on the surface of the supporting substrate SB in the direction of the x-axis along the longitudinal direction of the capacitor module 100. Here, respectively in relation to the capacitors 102a and 101a, the capacitors 101a and 102b, the capacitors 102b and 101b, the capacitors 101b and 102c and the capacitors 102c and 101c, the capacitors 102a, 101a, 102b, 101b and 102c have surfaces SP, parallel to the plane y-z and positioned at the positive direction side of the x-axis, and surfaces SN, parallel to the plane y-z and positioned at the negative direction side of the x-axis, to be disposed correspondingly in close proximity to each other.

When the PDU20 of such a structure is operated as a DC/AC converter under control of the PDU40, the capacitors 101a, 101b, 101c, 102a, 102b and 102c of the capacitor module 100 smooth the direct current supplied from the battery 30, upon which the smoothed direct current is supplied to the low level switching power modules 210a, 210b and 210c and the high level switching power modules 220a, 220b and 220c of the power module 200, and these switching power modules 210a, 210b, 210c, 220a, 220b and 220c convert the smoothed direct current to the three-phase alternate current, upon which such a three-phase alternate current is supplied to the motor 10.

With the structure set forth above, further, by forming the respective capacitors in the same basic structures and locating these capacitors under a positional condition in which the neighboring capacitors are rotated relative to each other at an angle of 180 degree about the z-axis, each unit capacitor component can be formed in a common structure and specification.

With such a structure mentioned above, neighboring capacitors, among the plurality of capacitors, are disposed adjacent to each other to define neighboring electrode terminals, among the electrode terminals thereof, with the same polarity. This eliminates a need of an electrical insulation member disposed between the wirings and ensures an increased freedom of wiring arrangement with a resultant minimized clearance between the capacitors. This increases a density of the plural capacitors in package, thereby enabling a size of the capacitor module to be reduced with a simplified structure.

Further, the electrode terminals are arranged to stand upright from first surfaces of the plurality of capacitors, respectively, such that the positive electrode terminals are disposed in the first surfaces at first circumferential portions thereof and the negative electrode terminals are disposed in the first surfaces at second circumferential portions oppositely distant from the first circumferential portions, and wherein the neighboring capacitors, among the plurality of capacitors, are juxtaposed with planes, orthogonal to the first surface thereof, being in close proximity to each other. This ensures an increased freedom of wiring arrangement while eliminating an electrical insulation member between wirings, thereby further reliably enabling a size of the capacitor module to be reduced with a simplified structure.

With the capacitors placed adjacent to each other among the plural capacitors, further, the neighboring capacitors, among the plurality of capacitors, have the neighboring electrode terminals with the same polarity connected to the common wiring portion, thereby further reliably enabling a size of the capacitor module to be reduced with a further simplified structure.

Furthermore, the plurality of capacitors are polar capacitors, formed in cuboid-like shapes, with being electrically connected in parallel to each other. This enables the capacitor module to exhibit a further large capacity with a reduced structure in size.

Moreover, the plurality of capacitors function as smoothing capacitors for smoothing the direct current, thereby forming the power drive unit by combining the capacitor module, including such the plurality of capacitors, with the power module available to perform conversion between the direct current and the alternate current.

As described above, according to the present invention, the capacitor can be provided such that the use of an electrical insulation member can be excluded between wirings with resultantly increased freedom of wiring arrangement, while reducing a size of the capacitor module with a simplified structure thereof to have general-purpose and universal character based on which it is expected to have wide applications to capacitor modules for such as a power drive unit.

Reference is hereby made to a Patent Application No. TOKUGAN 2010-061041 with a filing date of Mar. 17, 2010 in Japan, the entire content of which is incorporated herein by reference.

The present invention is not limited to the embodiment described above in respect of a kind, placement and the number of the component parts and it is of course to be understood that the relevant component parts may be suitably replaced by those having equivalent advantageous effects and alterations may be suitably made without departing from the scope of the present invention, in light of the teachings. The scope of the invention is defined with reference to the following claims

What is claimed is:

1. A capacitor module comprising:
   a plurality of capacitors juxtaposedly disposed, aligning in a first direction, to have electrode terminals that are composed of positive electrode terminals and negative electrode terminals, respectively;
   a first printed wire connected with the positive electrode terminals to have an intermediate portion and connecting portions bifurcating therefrom; and
   a second printed wire connected with the negative electrode terminals to have an intermediate portion and connecting portions bifurcating therefrom,
   wherein the electrode terminals are arranged to stand upright from first surfaces of the plurality of capacitors, respectively, such that the positive electrode terminals are disposed in the first surfaces at first circumferential portions thereof and the negative electrode terminals are disposed in the first surfaces at second circumferential portions oppositely distant from the first circumferential portions,
   and wherein neighboring capacitors, among the plurality of capacitors, are juxtaposed such that the first circumferential portions thereof are disposed in close proximity to each other in the first direction or the second circumferential portions thereof are disposed in close proximity to each other in the first direction, correspondingly, to alternately dispose plural pairs of the positive electrode terminals, one of which is disposed at the first circumferential portions of one of the neighboring capacitors disposed in close proximity to each other, with the other of which is disposed at the first circumferential portions of the other of the neighboring capacitors, and plural pairs of the negative electrode terminals, one of which is disposed at the second circumferential portions of one of the neighboring capacitors disposed in close proximity to each other with the other of which is disposed at the second circumferential portions of the other of the neighboring capacitors, in the first direction, while the plural pairs of the positive electrode terminals are connected with a common corresponding one of the connecting portions of the first printed wire and the plural pairs of the negative electrode terminals are connected with a common corresponding one of the connecting portions of the second printed wire.

2. The capacitor module according to claim 1, wherein the neighboring capacitors, among the plurality of capacitors, have the neighboring electrode terminals with the same polarity connected to a common wiring portion.

3. The capacitor module according to claim 1, wherein the plurality of capacitors are polar capacitors, formed in cuboid-like shapes, with being electrically connected in parallel to each other.

4. The capacitor module according to claim 1, wherein the plurality of capacitors function as smoothing capacitors for smoothing a direct current.

* * * * *